Sept. 5, 1967     J. C. HAYES ET AL     3,340,205
MANUFACTURE OF HIGH PURITY ALUMINA SOL FROM
RELATIVELY LOW GRADE ALUMINUM
Filed May 25, 1965
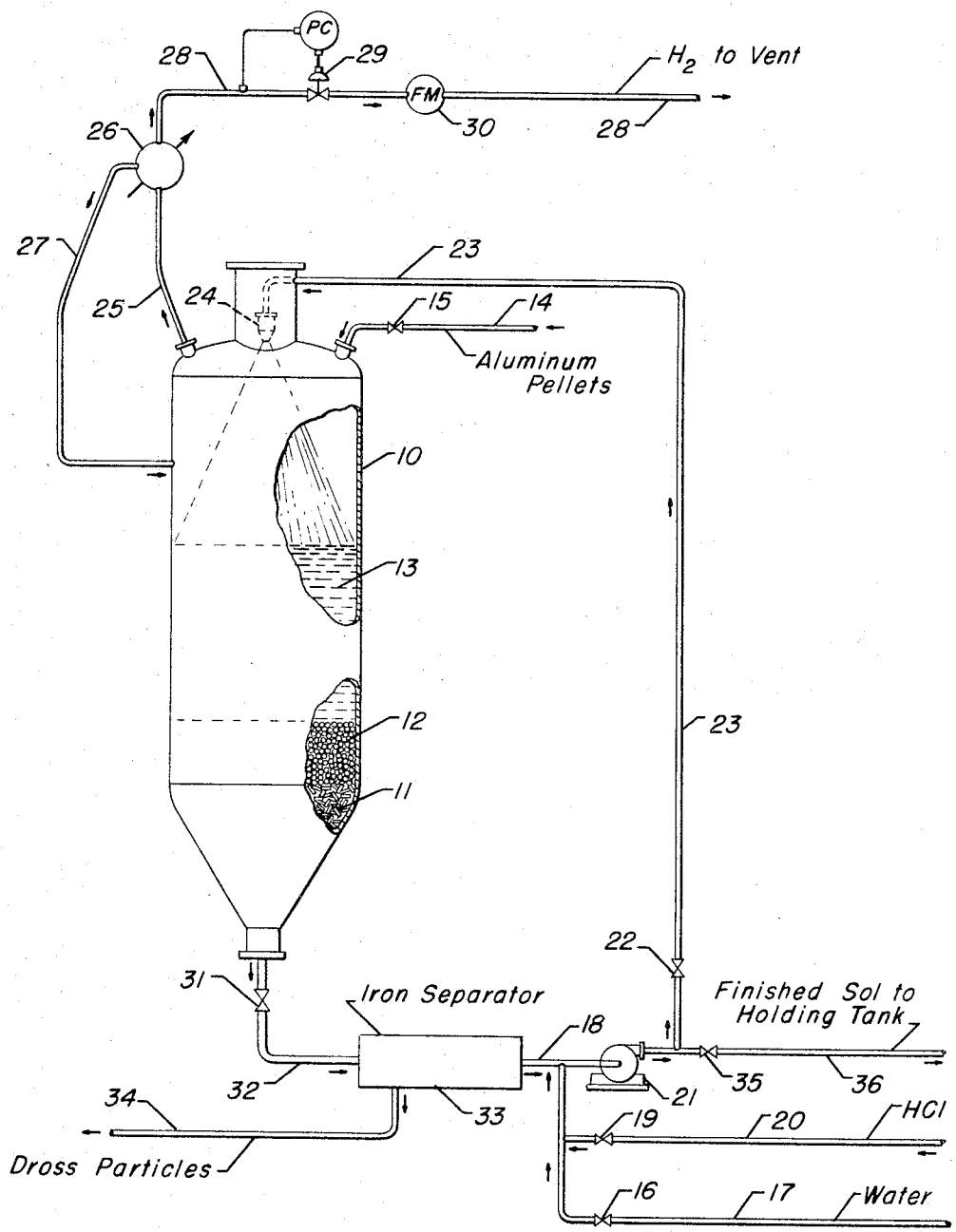
INVENTORS:
John C. Hayes
Daniel McGrath
Vladimir Haensel
BY:
ATTORNEYS

United States Patent Office 3,340,205
Patented Sept. 5, 1967

3,340,205
MANUFACTURE OF HIGH PURITY ALUMINA SOL FROM RELATIVELY LOW GRADE ALUMINUM
John C. Hayes, Palatine, Daniel McGrath, Prospect Heights, and Vladimir Haensel, Hinsdale, Ill., assignors to Universal Oil Products Company, Des Plaines, Ill., a corporation of Delaware
Filed May 25, 1965, Ser. No. 458,597
20 Claims. (Cl. 252—313)

ABSTRACT OF THE DISCLOSURE

Process for manufacturing high purity alumina sol from low purity aluminum metal containing metallic contaminants, such as iron, by digestion with a mineral acid. The contaminants are released from the aluminum charge into the sol in the form of small dross metal particles which are removed from the sol by mechanical means, preferably by magnetic separation, and preferably concurrently with the digestion step.

---

This invention relates to the preparation of alumina sols by dissolving metallic aluminum in an aqueous mineral acid. More particularly, the present invention is directed to improvements in the manufacture of high purity alumina sol, by the acid digestion process, from relatively low grade aluminum metal, which incorporate an in situ or simultaneous sol purification step.

Alumina sol is a well-known starting material for the preparation of alumina and alumina-containing refractory oxide composites such as alumina-silica. Such refractory oxides are useful as adsorbents and particularly as catalysts or catalyst supports. The general technique of preparing alumina sols by digesting aluminum metal in a mineral acid is well documented in the literature and prior art; with respect to sol preparation, as well as other aspects of alumina manufacture, the reader's attention is directed to U.S. Patents 2,620,314, 2,666,749, 2,689,226, 2,774,743 and 3,020,242 for a thorough background of the subject matter.

For certain end uses, notably platinum-alumina catalyst employed in the catalytic hydroreforming of hydrocarbons, it is generally recognized that the alumina support must be extremely pure, more specifically that the alumina support be substantially free of metallic impurities, particularly iron, copper, lead, nickel, chromium, titanium and zinc. These impurities, if present in the catalyst in appreciable amounts, have a deleterious effect upon the activity and/or stability and/or selectivity of platinum-alumina reforming catalyst. For example, present day specifications for spherical alumina-based reforming catalyst require that its iron content be not in excess of about 75–150 weight parts per million based on alumina.

The principal source of these metallic contaminants is the aluminum metal itself, comprising the charge to the digester. Aluminum is commercially available in various grades of purity such as 99.99% Al, 99.9% Al, 99% Al, etc. The lower grades of aluminum contain iron as a major contaminant, also significant amounts of copper, tin, lead, manganese, chromium, gallium, nickel, zinc, titanium, magnesium molybdenum and silicon. Alumina made from 99.99% Al will contain on the average, about 50 parts per million of iron; in contrast, alumina made from 99.9% Al may contain as much as 250 parts per million of iron. As indicated above, aluminas containing more than about 75–150 parts per million of iron are undesirable for reforming catalyst. The positive control of impurity content during manufacture of the alumina sol has heretofore been regarded as technically unattainable, one of the reasons therefor being the extremely low impurity levels encountered in the sol. Experience has shown that about a 6-fold magnification of impurity content occurs in going from alumina sol through the various stages of manufacture to the dropped, dried and calcined alumina spheres; for example, an iron content of 10 parts per million in a particular batch of sol will result in about 60 parts per million of iron in the finished spheres. Chemical treatment of the sol to remove impurities is, of course, out of the question because such treatment would interfere with the proper formulation of the alumina sol itself, the preparation of which is rigidly controlled to exacting specifications and is perhaps the most important single step in the overall catalyst manufacturing operation. In consequence, therefore, the only feasible way previously known to the catalyst manufacturer for meeting purity specifications has been to charge very high purity aluminum to the digester. Such high purity aluminum is customarily of the 99.99% Al grade, e.g., containing not more than about 0.01% by weight of metallic contaminants.

Our invention makes it possible to prepare very high purity alumina sols, and consequently high purity refractory alumina catalysts and catalyst supports, utilizing relatively low grade aluminum metal as the digester charge. For the purpose of this application and in consonance with the claims hereof, the low purity aluminum metal is one which comprises, broadly speaking, in excess of 0.01% by weight of one or more metallic contaminants, and more particularly in excess of about 0.02% by weight of metallic contaminants. In general, however, the aluminum charge should contain at least 90%, and preferably at least 95% by weight of aluminum. More commonly, the low purity aluminum metal will comprise at least 99% by weight of aluminum and from about 0.02% to about 1% by weight of metallic contaminants below aluminum in the electromotive series and including iron as the major contaminant. Typical commercial grades of such low purity aluminum analyze, for example, at 99% Al, 99.5% Al, 99.75% Al and 99.9% Al. Notwithstanding the use of such low purity aluminum, the present invention easily achieves alumina sol purities equal to, and in many cases far exceeding, purities heretofore obtained only with ultrapure or 99.99% aluminum.

The advantages flowing from the use of low grade aluminum charge will be readily appreciated by those skilled in the catalyst manufacturing arts. First and most apparent, of course, is the substantial cost saving; at the present time, the market price of 99.9% granulated aluminum ingot is about 35% less than that of 99.99% aluminum, while the price of 99% granulated aluminum ingot is about 45% less than that of 99.99% aluminum; these price differentials simply reflect the cost and complexities involved in refining aluminum metal to ultrapure specifications. Secondly, it is known that the presence of small amounts of metallic impurities in the aluminum charge greatly accelerates the dissolution or digestion of the aluminum metal by the acid, probably through a combination of catalytic and electrochemical mechanisms; for example, in a given digester unit an alumina sol of normal concentration and composition requires 70–100 hours of digestion time when 99.99% aluminum is used; when 99.9% aluminum is used, a similar sol can be prepared in only 20–30 hours. At lower purity levels, the reaction of the aluminum metal becomes even more rapid. For manufacturing high purity sols, however, this means of increasing the reaction rate can be utilized only if the metallic impurities are removed from the sol at a controlled rate during the digestion, in such relation to their rate of evolution, that the catalytic effect is largely preserved, while the total contaminant level in the finished sol is nevertheless substantially reduced. As will be described more fully hereinbelow, our invention permits achieving just such a balance between increased reaction rate and decreased contaminant concentration. Thirdly, the use of ultrapure or 99.99% aluminum frequently leads to "milk" formation in the sol, e.g., excessive turbidity caused by abnormal growth of aluminum micelles; milk formation is largely avoided and is more easily controlled through the use of the more reactive impure aluminum metal.

Our invention is predicated on the discovery that when relatively impure aluminum metal, especially in pelletized or other subdivided form, is digested in a mineral acid, the impurities therein, which usually include iron as a major contaminant, do not digest or dissolve as rapidly as the pure aluminum metal. Rather, it appears that small colloidal particles of reduced metallic impurities develop in the sol during digestion. These particles are invisible to the eye, being less than about 0.1 micron in diameter, and individually cannot be mechanically separated from the sol. Surprisingly and fortuitously, however, these colloidal impurity particles tend to agglomerate into large suspended non-colloidal clusters under the conditions of the digestion. The non-colloidal clusters, termed herein "dross metal particles," are impurity agglomerates which are black in color, are readily visible in the sol having a size of the order of 1–100 microns, and have proven to be separable from the sol by mechanical means such as filtration, centrifugation or magnetic separation.

The composition of the dross metal particles includes many or all of the several impurities originally associated with the aluminum charged and at concentrations substantially greater than in the charge. When iron and/or nickel is present as an impurity, which is nearly always the case, the dross metal particles comprise sufficient iron and/or nickel to be magnetic and are therefore susceptible to magnetic collection.

We have further found that as the impure aluminum pellets react in digestion, they become progressively smaller in size but not richer in contaminants. This indicates that the contaminants occur as uniformly distributed isolated colloidal size particles in the aluminum matrix. During digestion of the aluminum, the colloidal impurity particles are released or dislodged from the matrix more or less continuously and become dispersed in the sol. A specific adaptation of our invention utilizes this phenomenon to achieve a controlled impurity level during digestion by effecting the continuous removal of dross particles, at a predetermined rate in relation to their rate of evolution, during the digestion process.

Our invention is therefore directed to the purification of an alumina sol by mechanical particle collection means. According to one embodiment of the invention, the digestion time is made sufficiently short, as by reducing the size of the aluminum pellets or by changing the acid concentration as a function of time, so that the dross metal particles are not appreciably dissolved during the course of the digestion, and then separating the particles from the finished sol as it is discharged from the digester to subsequent processing stages. According to another embodiment of the invention, especially adapted for the case when the finished sol composition is such as to require a normal or longer digestion time, the dross metal particles are intermittently or continuously removed from the sol concurrently with the digestion. This latter procedure seeks to minimize or control the residence time of the particles in the acidic sol and so to minimize or control dissolution of the metallic impurities. It will be obvious, of course, that to the extent the metallic impurities are permitted to go into solution, whether as cations or as hydroxylated complexes, they can no longer be separated from the sol by mechanical means.

One embodiment of this invention relates to a process for manufacturing high purity alumina sol from low purity aluminum metal containing in excess of 0.01% by weight of metallic contaminant which comprises contacting a charge of such low purity aluminum with an aqueous mineral solution in an aluminum digestion zone; thereby dissolving said aluminum and forming in said zone an alumina sol in admixture with dross metal particles originating from said charge and comprising said metallic contaminant at a concentration per particle substantially greater than in the charge; continuing the digestion for a time and under digestion conditions selected to produce an alumina sol having predetermined aluminum and acid anion concentrations; at least partly concurrently with digestion, mechanically removing from the digestion zone at least a portion of the dross metal particles; and recovering from the digestion zone a finished alumina sol having a metallic contaminant content substantially lower than would be obtained in the absence of said mechanical removal step.

Another embodiment of our invention is directed to a process for manufacturing high purity alumina sol from low purity aluminum metal comprising at least 95% by weight of aluminum and containing in excess of 0.02% by weight of metallic contaminants below aluminum in the electromotive series and including iron as a major contaminant which comprises contacting a charge of such low purity aluminum in subdivided form with an aqueous mineral acid solution in an aluminum digestion zone; thereby dissolving said aluminum and forming in said zone an alumina sol in admixture with dross metal particles originating from said charge and comprising iron at a concentration per particle substantially greater than in the charge; continuing the digestion for a time and under digestion conditions selected to produce an alumina sol having predetermined aluminum and acid anion concentrations without appreciably dissolving said particles; mechanically separating the particles from the sol; and recovering from the digestion zone a finished alumina sol having an iron content of less than about 100 weight parts per million based on alumina.

A more specific embodiment of this invention concerns a process for manufacturing high purity alumina sol from low purity aluminum metal comprising at least 99% by weight of aluminum and containing from 0.02% to 1% by weight of metallic contaminants including iron which comprises contacting a charge of such low purity aluminum in subdivided form with an aqueous hydrochloric acid solution in an aluminum digestion zone; thereby dissolving said aluminum and forming in said digestion zone an alumina sol in which there are suspended dross metal particles originating from said charge and which emanate therefrom more or less continuously during the course of the digestion, said particles comprising iron at a concentration per particle substantially greater than in the charge; continuing the digestion for a time and under digesting conditions selected to produce an alumina sol having predetermined aluminum and chloride concentrations; at least partly concurrently with the digestion, withdrawing from said digestion zone a stream of alumina sol containing said dross metal particles, passing said stream through a particle separation zone and therein mechanically separating the particles from the stream, and returning at least a portion of said stream having a reduced particle content to the digestion zone; and recovering from the digestion zone a finished alumina sol having an iron content substantially less than 200 weight parts per million based on alumina.

A further specific embodiment of our invention relates to a process for manufacturing high purity alumina sol from low purity aluminum metal containing in excess of 0.01% by weight of iron which comprises contacting a charge of such low purity aluminum with an aqueous mineral acid solution in an aluminum digestion zone; thereby dissolving said aluminum and forming in said digestion zone an alumina sol in which there are suspended magnetic dross metal particles originating from said charge and which emanate therefrom more or less continuously during the course of the digestion, said particles comprising iron at a concentration per particle substantially greater than in the charge; continuing the digestion for a time and under digestion conditions selected to produce an alumina sol having predetermined aluminum and acid anion concentrations; at least partly concurrently with the digestion, withdrawing from said digestion zone a stream of alumina sol containing said magnetic dross metal particles, passing said stream through a magnetic separation zone and therein subjecting the particles to a magnetic field whereby the particles are removed from the sol, and returning at least a portion of said stream having a reduced particle content to the digestion zone; and recovering from the digestion zone a finished alumina sol having an iron content substantially lower than would be obtained in the absence of said magnetic separation step.

The preparation of alumina sol by acid digestion involves adding metered quantities of aluminum, acid and treated deionized water to a reaction vessel or digester. The digestion may be accomplished continuously or batchwise. The aluminum metal is preferably in the form of granulated ingot or pellets about ¼" to ¾" in diameter. The acid may be HCl, $H_2SO_4$ or $HNO_3$. For the production of platinum catalyst for reforming gasoline fractions, we prefer to use hydrochloric acid because sulfate is detrimental to the catalyst and must be subsequently removed from the sol, and because the finished catalyst desirably contains combined chlorine, at least a portion of which is automatically introduced at a controlled level during the digestion stage. However, our invention works equally well with any mineral acid capable of dissolving aluminum. The digestion process involves two reactions; formation of alumina sol accompanied by evolution of hydrogen, and hydrolysis of the aluminum salt. Progress of the reactions is followed by the quantity of hydrogen evolved during the digestion, as well as by analysis of the sol. An excess of aluminum pellets is preferably maintained in the digester at all times. When the digester contents reach the desired composition, the batch of alumina sol is transferred into a storage tank to await further processing into dropped, dried and calcined alumina spheres. For continuous digestion, aluminum, acid and water are substantially continuously added to the digester, the composition of the sol is maintained constant at final specifications, and a stream of finished sol is continuously withdrawn from the digester.

Our invention is more specifically described in connection with the accompanying drawing which is a simplified flow diagram of a batch digester with continuous sol recycle in combination with a dross particle separator. This flow scheme represents a preferred mode of practicing our invention but is not intended to be limiting upon its broad scope, and it will be understood that our invention is equally applicable to a continuous digestion process.

In the drawing, numeral 10 designates a digester vessel. A bed of ceramic packing 11 such as Raschig rings, saddles or balls, is disposed in the bottom of the digester. A bed of impure aluminum pellets 12, charged through line 14 and valve 15, rests upon packing 11. The acid sol solution is indicated by numeral 13. Prior to the start of a new run, digester 10 contains unexpended pellets from the preceding run as well as a quantity of water added to quench the reaction of the preceding run. A measured quantity of fresh impure aluminum pellets is charged to the digester through line 14 and valve 15. Liquid circulation is commenced through the loop comprising valve 31, line 32, iron separator 33, suction line 18, pump 21, valve 22, line 23 and spray head 24. A measured quantity of deionized water is admitted to the system through valve 16 and line 17. A measured quantity of hydrochloric acid is admitted to the system through valve 19 and line 20. After the required amounts of water and acid have been charged, valves 16 and 19 are blocked in, and sol circulation through line 23 is established at the rate of about 2–15 digester sol volumes per hour. The initial superficial concentration of HCl in the digester, e.g., the concentration which would exist in the absence of any reaction with the aluminum, may be in the range of about 4% to about 20% by weight, and preferably is about 8% to about 15% by weight. Vent gas, comprising hydrogen, steam, and HCl is taken off through line 25 to a condenser 26 which is free draining to the digester through line 27 to minimize loss of water and acid during digestion. Cooled saturated vent gas is taken through line 28 and a back pressure control valve 29 set to maintain the digester pressure in the range of about 0–35 p.s.i.g.; corresponding digester temperatures are in the range of about 80°–300° F. The vent gas is passed through an integrating, totalizing or displacement type flowmeter 30; the total hydrogen make is substantially stoichiometric with aluminum consumed and so provides an operating guide as to the degree of completeness of the digestion.

During the course of the digestion, which may require from about 8 to about 40 hours, dross metal particles are fairly continuously released from the impure aluminum pellets and are dispersed in the sol. The sol containing the particles in suspension is circulated via valve 31 and line 32 through a mechanical separation means 33; separation means 33 may be, for example, a continuous rotary-drum vacuum filter, an in-line motor driven centrifuge, a cyclone separator, or a magnetic separator in which the particles are subjected to the influence of a magnetic field of sufficient strength to capture them from the flowing liquid stream. These apparatuses are conventional and their specific design forms no part of our invention. If desired, a by-pass may be provided around separator 33 so that only a portion of the circulating sol is passed therethrough or so that the iron separator can be placed on stream at some later time during or following the digestion. Dross metal particles may be continuously or intermittently withdrawn from the separator through line 34. In most cases, the finished sol will contain about 9–12.5% by weight of chloride with an Al–Cl weight ratio of about 1.00–1.55. Completion of digestion is determined by total hydrogen made and by specific gravity and chemical analysis of the circulating sol. The finished alumina sol is discharged from the digester through valve 35 and line 36, valve 22 being closed, to a holding tank for further processing.

By effecting the removal of dross metal particles, either upon conclusion of the run, but preferably at least partly concurrently with the run, very high purity sols are obtained even though relatively impure aluminum is used. When charging 99.9% Al to the digester, and without particle removal, the iron content of the finished sol will be of the order of 200–250 p.p.m. based on $Al_2O_3$. With particle removal, the iron content is reduced substantially below 200 p.p.m.; in fact, sol purities of less than 100 p.p.m. Fe are routinely achieved, and sol purities as low as 10–50 p.p.m. Fe based on alumina are also obtained without difficulty.

The advantages and benefits of our invention are further demonstrated by the following example:

A series of four runs are made, designated Runs A, B, C and D, utilizing the apparatus and flow scheme of the accompanying drawing. The procedure followed is same in each run except as noted below:

|  | Al charge purity, percent | Particle Separation |
| --- | --- | --- |
| Run A | 99.99 | None. |
| Run B | 99.9 | Do. |
| Run C | 99.9 | Continuous during digestion. |
| Run D | 99.9 | Once-through after digestion. |

The digester is loaded with 3300 lbs. of granulated (½") aluminum ingot and 200 gals. of deionized water. The digester is purged with $N_2$ and pressured to 5 p.s.i.g.

Liquid circulation is established at the rate of 100 gals. per minute. Treated deionized water, preheated to 200° F., is added at the rate of 170 gals. per hour and halted at a total delivery of 340 gals. Hydrochloric acid (32% HCl by weight) is added at the rate of 83 gals. per hour and halted at a total delivery of 332 gals. In Run C, the total circulating sol stream is passed through a magnetic particle separator during the course of the digestion. In Run D, the magnetic separator is blocked in and by-passed until the end of the run, then the finished sol is discharged through the separator to a holding tank. In Runs A and B, the separator is by-passed at all times and is not used. In all runs, the digestion is continued until the sol contains 11.2% Al by weight and 10% Cl by weight, at which time the finished sol is transferred to a storage tank. About 1100 pounds of aluminum are consumed in each run. Table I below summarizes the results of the runs giving a comparison of digestion times and iron content of the respective sols:

TABLE I

| Run | Charge aluminum purity, percent | Dross Separation | Digestion time, hours | Fe in finished sol, p.p.m./ Al$_2$O$_3$ |
|---|---|---|---|---|
| A | 99.99 | None | 84 | 50 |
| B | 99.9 | ___do___ | 21 | 245 |
| C | 99.9 | Continuous | 27 | 25 |
| D | 99.9 | Once-through | 21 | 55 |

The lower reactivity of the ultrapure aluminum is reflected in the very long digestion time of Run A. As illustrated by Run B, a change to the lower grade 99.9% aluminum reduces the digestion time by 75%, but the iron content of the finished sol has increased from 50 to 245 p.p.m. based on alumina. Run C, which duplicates the conditions of Run B but with the continuous magnetic removal of dross metal particles during digestion, achieves an iron content in the finished sol of only 25 p.p.m. based on alumina or one-half the iron level resulting from ultra-pure aluminum; Run C requires a slightly but not significantly longer digestion time due to the forced lower impurity concentration prevailing during digestion. Run D, which duplicates the conditions of Run C but with the magnetic separation effected in a single pass through the separator at the conclusion of the run, produces an iron content of 55 p.p.m., slightly higher than that resulting from ultrapure aluminum but nevertheless well below the maximum level tolerable for reforming catalyst; the increased iron level of Run D, as compared with Run C, is due to the greater dissolution of iron resulting from the longer average residence time of the dross particles in the acid sol.

Table II below is a metals analysis by emission spectroscopy, of the aluminum metal charge, alumina sol and dross employed and obtained from Run C:

TABLE II.—RUN C ANALYSIS

| | Weight Percentages | | |
|---|---|---|---|
| | 99.9% Al charge | Alumina sol | Dross |
| Al | (¹) | 11.2 | 21.7 |
| Fe | 0.05 | <0.001 | 15.0 |
| Mn | 0.0013 | <0.001 | 0.002 |
| Cr | 0.002 | | 0.2 |
| Ni | <0.001 | | 0.2 |
| V | 0.003 | <0.002 | |
| Pb | <0.001 | <0.001 | 0.5 |
| Cu | 0.0014 | <0.001 | 2.5 |
| Zn | <0.003 | | 0.1 |
| Ti | 0.004 | 0.003 | 0.08 |
| Mg | 0.0015 | <0.01 | 0.05 |
| Ca | | <0.06 | |
| Na | | <0.05 | |
| Mo | | | 0.02 |
| Sn | | | 1.5 |
| Ga | 0.012 | 0.02 | |
| Si | 0.04 | <0.01 | 0.4 |

¹ Major component.

The total amount of dross metal collected in about 3.5 lbs. As appears in Table II, iron is a major contaminant of the dross, comprising about 15% thereof by weight. Substantial amounts of other impurities, including non-magnetic metal, are also present such as copper, tin, lead, silicon, nickel, chromium, zinc and titanium. Although some aluminum is lost with the dross, the absolute amount of aluminum so lost is insignificant in relation to the amount consumed.

While we prefer to employ a mechanical particle separation zone in a recycle line or in a discharge line, it is within the scope of our invention to employ such means, especially magnetic means, in more direct association with the digester vessel itself. For example, the digester may be constructed of glass or other non-magnetic material and a number of strong electromagnets placed around the exterior surface thereof whereby to collect the dross particles along the inside wall of the digester. Alternatively, one or more magnets in the form of a probe with a suitable non-magnetic protective sheath may be inserted directly into the body of the sol in the digester. These alternative arrangements would not, however, take the particles out of contact with the sol during digestion, so that somewhat higher impurity levels, of the order of magnitude indicated by Run D above, would be anticipated. While the mechanical removal of dross metal particles may, in accordance with our invention, be effected by filtration, centrifugation or magnetic separation, we prefer to employ magnetic means since it requires relatively simple hardware and removes not only magnetic impurities such as iron and nickel but also, surprisingly, appreciable quantities of non-magnetic impurities which somehow become occluded with the magnetic conglomerates.

It is to be appreciated that our invention affords substantial improvements over prior art processes for the preparation of alumina sols by acid digestion. The metallic impurities present in the lower grades of aluminum metal which cause the digestion rate of the pure aluminum to increase are themselves considerably more resistant to dissolution than the desired aluminum. The net effect is that the differentials in the rate of solution of the desired pure aluminum metal and the undesirable metallic contaminants increase as the purity of the aluminum decreases. Therefore, the effectiveness of our in situ purification step increases as the purity of the aluminum charge stock decreases, at least down to about 90% aluminum by weight. By virtue of our invention, therefore, lower grade aluminum metal may be employed to manufacture alumina sol having purities equaling or exceeding those heretofore attainable only from the highly refined 99.99% Al grade. The use of such lower grade aluminum affords a substantial reduction in catalyst cost, first because of the less costly aluminum charge and second because the markedly reduced digestion time provides a corresponding increase in throughput for a given capital investment. In addition, our invention provides a means for the close control of the impurities level in the finished sol which was not possible by previous methods of manufacture.

We claim as our invention.

1. A process for manufacturing high purity alumina sol from low purity aluminum metal containing in excess of 0.01% by weight of a metallic contaminant which comprises contacting a charge of such low purity aluminum with an aqueous mineral acid solution in an aluminum digestion zone; thereby dissolving said aluminum and forming in said zone an alumina sol in admixture with dross metal particles originating from said charge and comprising said metallic contaminant at a concentration per particle substantially greater than in the charge; continuing the digestion for a time and under digesting conditions selected to produce an alumina sol having predetermined aluminum and acid anion concentrations; at least partly concurrently with the digestion, mechanically removing from the digestion zone at least a portion of the dross metal particles; and recovering from the digestion zone a finished alumina sol.

2. Process of claim 1 wherein said mineral acid is hydrochloric acid.

3. Process of claim 1 wherein said mineral acid is sulfuric acid.

4. Process of claim 1 wherein said mineral acid is nitric acid.

5. A process for manufacturing high purity alumina sol from low purity aluminum metal comprising at least 95% by weight of aluminum and containing in excess of 0.01% by weight of metallic contaminants including iron which comprises contacting a charge of such low purity aluminum in subdivided form with an aqueous mineral acid solution in an aluminum digestion zone; thereby dissolving said aluminum and forming in said zone an alumina sol in admixture with dross metal particles originating from said charge and comprising iron at a concentration per particle substantially greater than in the charge; continuing the digestion for a time and under digesting conditions selected to produce an alumina sol having predetermined aluminum and acid anion concentrations; at least partly concurrently with the digestion, mechanically removing from the digestion zone at least a portion of the dross metal particles; and recovering from the digestion zone a finished alumina sol.

6. Process of claim 5 wherein said mineral acid is hydrochloric acid.

7. Process of claim 5 wherein said mineral acid is sulfuric acid.

8. A process for manufacturing high purity alumina sol from low purity aluminum metal comprising at least 99% by weight of aluminum and containing from 0.02% to 1% by weight of metallic contaminants including iron which comprises contacting a charge of such low purity aluminum in subdivided form with an aqueous hydrochloric acid solution in an aluminum digestion zone; thereby dissolving said aluminum and forming in said digestion zone an alumina sol in which there are suspended dross metal particles originating from said charge and which emanate therefrom more or less continuously during the course of the digestion, said particles comprising iron at a concentration per particle substantially greater than in the charge; continuing the digestion for a time and under digesting conditions selected to produce an alumina sol having predetermined aluminum and chloride concentrations; at least partly concurrently with the digestion, withdrawing from said digestion zone a stream of alumina sol containing said dross metal particles, passing said stream through a particle separation zone and therein mechanically separating the particles from the stream and returning at least a portion of said stream having a reduced particle content to the digestion zone; and recovering from the digestion zone a finished alumina sol having an iron content substantially less than 200 weight parts per million based on $Al_2O_3$.

9. Process of claim 8 wherein mechanical separation of dross metal particles is effected by filtration means.

10. Process of claim 8 wherein the mechanical separation of dross metal particles is effected by centrifugal separation means.

11. A process for manufacturing high purity alumina sol from low purity aluminum metal containing in excess of 0.01% by weight of iron which comprises contacting a charge of such low purity aluminum with an aqueous mineral acid solution in an aluminum digestion zone; thereby dissolving said aluminum and forming in said digestion zone an alumina sol in which there are suspended magnetic dross metal particles originating from said charge and which emanate therefrom more or less continuously during the course of the digestion, said particles comprising iron at a concentration per particle substantially greater than in the charge; continuing the digestion for a time and under digesting conditions selected to produce an alumina sol having predetermined aluminum and acid anion concentrations; at least partly concurrently with the digestion, withdrawing from said digestion zone a stream of alumina sol containing said magnetic dross metal particles, passing said stream through a magnetic separation zone and therein subjecting the particles to a magnetic field whereby the particles are removed from the sol, and returning at least a portion of said stream having a reduced particle content to the digestion zone; and recovering from the digestion zone a finished alumina sol.

12. A process for manufacturing high purity alumina sol from low purity aluminum metal comprising at least 95% by weight aluminum and containing in excess of 0.01% by weight of metallic contaminants including iron which comprises contacting a charge of such low purity aluminum in subdivided form with an aqueous hydrochloric acid solution in an aluminum digestion zone; thereby dissolving said aluminum and forming in said digestion zone an alumina sol in which there are suspended magnetic dross metal particles originating from said charge and which emanate therefrom more or less continuously during the course of the digestion, said particles comprising iron at a concentration per particle substantially greater than in the charge; continuing the digestion for a time and under digesting conditions selected to produce an alumina sol having predetermined aluminum and chloride concentrations; at least partly concurrently with the digestion, withdrawing from said digestion zone a stream of alumina sol containing said magnetic dross metal particles, passing said stream through a magnetic separation zone and therein subjecting the particles to a magnetic field whereby the particles are removed from the sol, and returning at least a portion of said stream having a reduced particle content to the digestion zone; and recovering from the digestion zone a finished alumina sol.

13. A process for manufacturing high purity alumina sol from low purity aluminum metal comprising at least 99% by weight of aluminum and containing from 0.02% to 1% by weight of metallic contaminants including iron which comprises contacting a charge of such low purity aluminum in subdivided form with an aqueous hydrochloric acid solution in an aluminum digestion zone; thereby dissolving said aluminum and forming in said digestion zone an alumina sol in which there are suspended dross metal particles originating from said charge and which emanate therefrom more or less continuously during the course of the digestion, said particles comprising iron at a concentration per particle substantially greater than in the charge; continuing the digestion for a time and under digesting conditions selected to produce an alumina sol having predetermined aluminum and chloride concentrations; at least partly concurrently with the digestion, withdrawing from said digestion zone a stream of alumina sol containing said magnetic dross metal particles, passing said stream through a magnetic separation zone and therein subjecting the particles to a magnetic field whereby the particles are removed from the sol, and returning at least a portion of said stream having a reduced particle content to the digestion zone; and recovering from the digestion zone a finished alumina sol.

14. A process for manufacturing high purity alumina sol from low purity aluminum metal comprising at least 99% by weight of aluminum and containing from 0.02% to 1% by weight of metallic contaminants including iron as a major contaminant which comprises contacting a charge of such low purity aluminum in subdivided form with an aqueous hydrochloric acid solution in an aluminum digestion zone; thereby dissolving said aluminum and forming in said digestion zone an alumina sol in which there are suspended magnetic dross metal particles originating from said charge and which emanate therefrom more or less continuously during the course of the digestion, said particles comprising iron at a conecentration per particle substantially greater than the charge;

continuing the digestion for a time and under digesting conditions selected to produce an alumina sol having predetermined aluminum and chloride concentrations; at least partly concurrently with the digestion, withdrawing from said digestion zone a stream of alumina sol containing said magnetic dross metal particles, passing said stream through a magnetic separation zone and therein subjecting the particles to a magnetic field whereby the particles are removed from the sol, and returning at least a portion of said stream having a reduced particle content to the digestion zone; and recovering from the digestion zone a finished alumina sol having an iron content substantially less than 200 weight parts per million based on $Al_2O_3$.

15. A process for manufacturing high purity alumina sol from low purity aluminum metal comprising at least 99% by weight of aluminum and containing from 0.02% to 1% by weight of metallic contaminants including iron, nickel, and copper which comprises contacting a charge of such low purity aluminum in subdivided form with an aqueous hydrochloric acid solution in an aluminum digestion zone; thereby dissolving said aluminum and forming in said digestion zone an alumina sol in which there are suspended magnetic dross metal particles originating from said charge and which emanate therefrom more or less continuously during the course of the digestion, said particles comprising iron, nickel and copper at concentrations per particle substantially greater than in the charge; continuing the digestion for a time and under digesting conditions selected to produce an alumina sol having predetermined aluminum and chloride concentrations; at least partly concurrently with the digestion, withdrawing from said digestion zone a stream of alumina sol containing said magnetic dross metal particles, passing said stream through a magnetic separation zone and therein subjecting the particles to a magnetic field whereby the particles are removed from the sol, and returning at least a portion of said stream having a reduced particle content to the digestion zone; and recovering from the digestion zone a finished alumina sol having an iron, nickel and copper content substantially less than 200 weight parts per million based on $Al_2O_3$.

16. Process of claim 15 wherein said finished alumina sol has an iron content of less than about 100 weight parts per million based on $Al_2O_3$.

17. Process of claim 15 wherein said finished alumina sol contains 9.0–12.5% by weight of choride and has an aluminum to chloride weight ratio of 1.00–1.55.

18. Process of claim 15 wherein the digestion zone is maintained at a temperature of 80°–300° F.

19. Process of claim 15 wherein the digestion zone is maintained under a pressure of 0–35 p.s.i.g.

20. A process for manufacturing high purity alumina sol from low purity aluminum metal comprising at least 95% by weight of aluminum and containing in excess of 0.02% by weight of metallic contaminants below aluminum in the electromotive series and including iron as a major contaminant which comprises contacting a charge of such low purity aluminum in subdivided form with an aqueous mineral acid solution in an aluminum digestion zone; thereby dissolving said aluminum and forming in said zone an alumina sol in admixture with dross metal particles originating from said charge and comprising iron at a concentration per particle substantially greater than in the charge; continuing the digestion for a time and under digesting conditions selected to produce an alumina sol having predetermined aluminum and acid anion concentrations without appreciably dissolving said particles; mechanically separating the particles from the sol; and recovering from the digestion zone a finished alumina sol having an iron content of less than about 100 weight parts per million based on $Al_2O_3$.

References Cited
UNITED STATES PATENTS
3,020,242  2/1962  McCartney et al ___ 252—313 X LEON D. ROSDOL, *Primary Examiner.*

R. D. LOVERING, *Assistant Examiner.*